Dec. 19, 1944.   A. J. MILLER   2,365,276
BLOWPIPE MACHINE
Filed Nov. 7, 1941   3 Sheets-Sheet 1

INVENTOR
ALFRED J. MILLER
BY
ATTORNEY

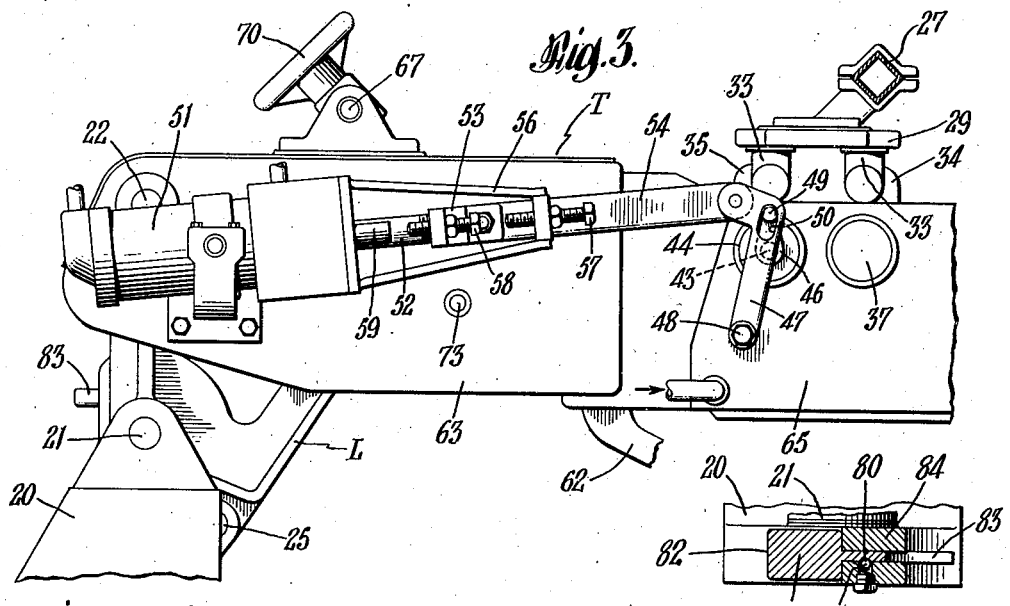

Dec. 19, 1944.    A. J. MILLER    2,365,276
BLOWPIPE MACHINE
Filed Nov. 7, 1941    3 Sheets-Sheet 3
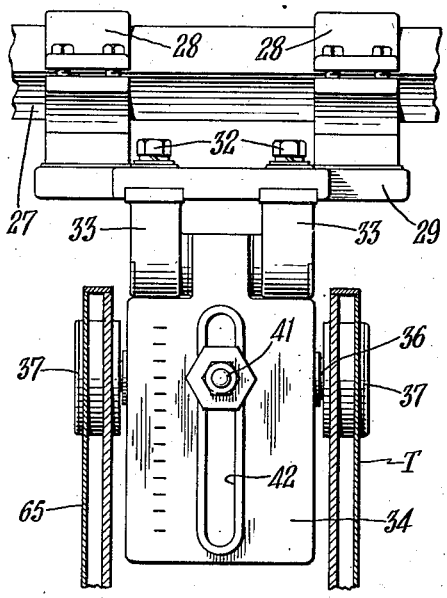
Fig. 7.
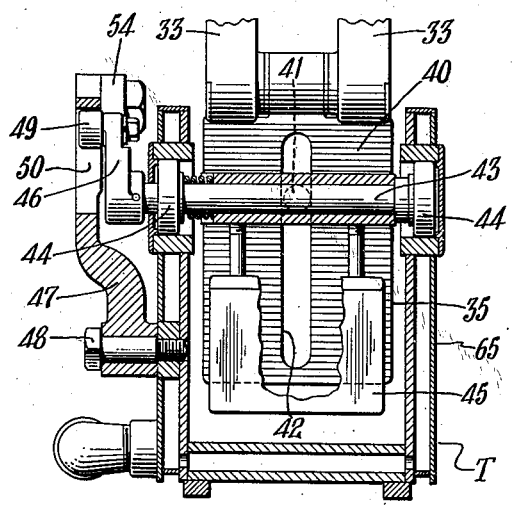
Fig. 8.
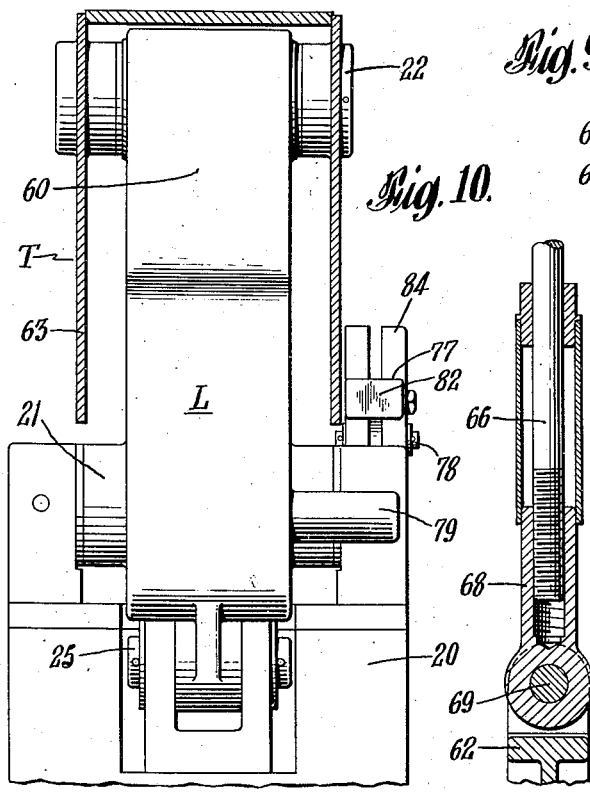
Fig. 10.
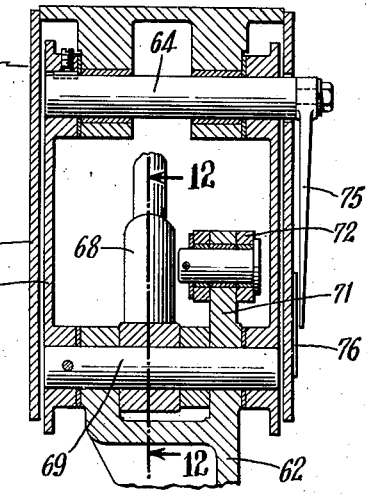
Fig. 9.
Fig. 12.
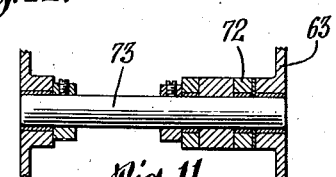
Fig. 11.
INVENTOR
ALFRED J. MILLER
BY
ATTORNEY Patented Dec. 19, 1944

2,365,276

UNITED STATES PATENT OFFICE 2,365,276

BLOWPIPE MACHINE

Alfred J. Miller, Garwood, N. J., assignor to The Linde Air Products Company, a corporation of Ohio Application November 7, 1941, Serial No. 418,235

27 Claims. (Cl. 266—23)

This invention relates to blowpipe machines, and more particularly to a machine for thermochemically cutting ferrous metal bodies such as steel bars and billets of various sizes and shapes.

Steel bars, billets, and the like have previously been cut by blowpipe or torch-translating machines which move a gas cutting torch discharging an oxidizing gas jet, transversely across a bar at a suitable cutting speed to thermochemically form kerf therethrough. Such bars and billets are usually of various sizes and may be either round or rectangular according to the type or types of products the mill is rolling. Such prior art machines, however, are especially constructed and arranged for cutting bars of a particular shape and a machine adapted for cutting round bars or billets is not suitable for cutting rectangular stock and vice-versa. Such machines also cannot be readily and efficiently withdrawn to an inoperative position out of the way of other mechanism and generally it has been necessary to provide a different machine for each commercial application.

It is the principal object of the present invention to provide an improved blowpipe propelling machine and to provide such a machine particularly adapted for thermochemically severing ferrous metal bodies such as round and/or rectangular steel bars, billets, and the like.

Other objects of this invention are to provide a blowpipe machine in which the blowpipe is movable both horizontally and through an arc toward and away from the workpiece. To provide such a machine in which the blowpipe is movable in substantially a straight line toward and away from the body to be severed in accordance with the size of the body and to provide such a machine in which the blowpipe is movable through an arc toward and away from a position substantially adjacent said body; to provide such a machine which is readily adaptable for severing bodies of different sizes; to provide such a machine in which the blowpipe is supported by a boom pivotally connected to a supporting link and extending toward the body to be severed; to provide such a machine in which the blowpipe propelling mechanism is partially supported by the body being severed; to provide such a machine which includes an improved blowpipe propelling mechanism adjustable to move at least the nozzle end of the blowpipe through a path substantially parallel to either a flat or arcuate surface; to provide such a machine which includes an improved means for controlling the rate of travel of a blowpipe; to provide such a machine including a blowpipe supported by a hinged boom so constructed and arranged as to maintain the forward end in substantially a horizontal position when positioned adjacent a workpiece which is any one of a plurality of sizes; and to provide such a machine which is relatively simple and rugged in construction and economical to manufacture.

These and other novel features will become apparent from the following description taken in connection with the accompanying drawings, in which:

Fig. 3 is a fragmentary elevational view of the machine of Fig. 1 and taken from the opposite side;

Fig. 4 is a fragmentary side elevational view, similar to Fig. 1, and with portions broken away to show more clearly the internal structure;

Fig. 5 is an enlarged view of a link gripping member;

Fig. 6 is a fragmentary sectional view taken along line 6—6 of Fig. 4;

Figs. 7 to 11 are enlarged fragmentary sectional views taken along the correspondingly numbered section lines shown on Fig. 4; and, Fig. 12 is an enlarged fragmentary view of a portion of the adjustment means and is taken along line 12—12 of Fig. 9.

Figure 1:
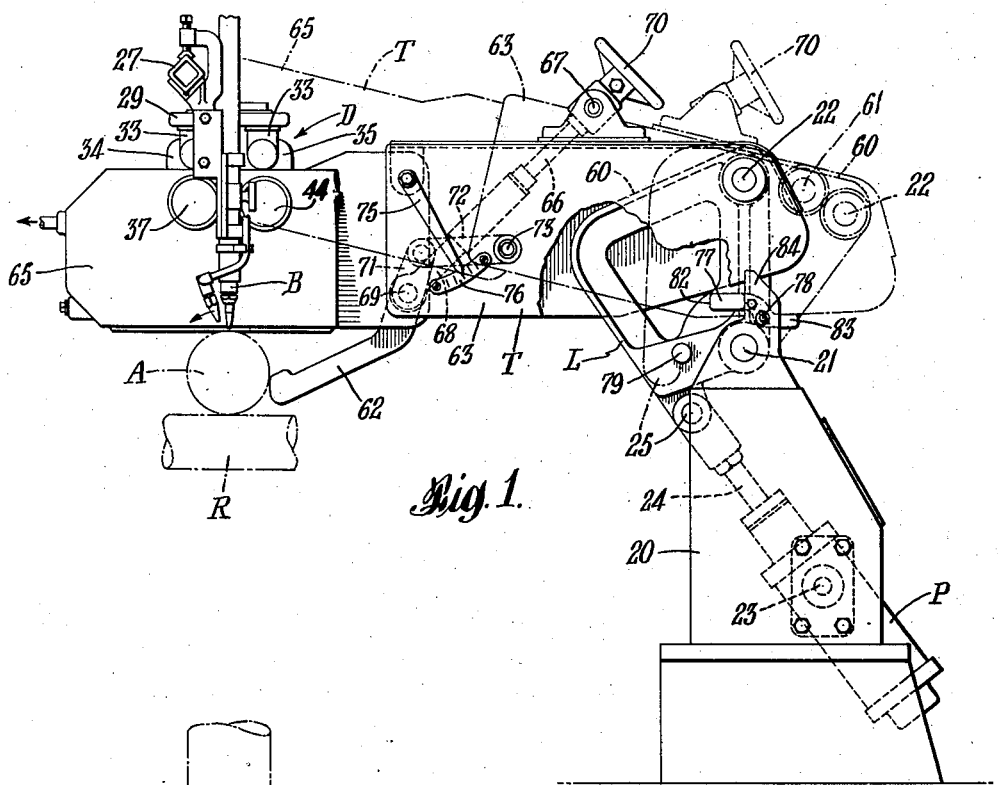
Fig. 1 is a side elevational view of a machine embodying the principles of the present invention.
Figure 2:
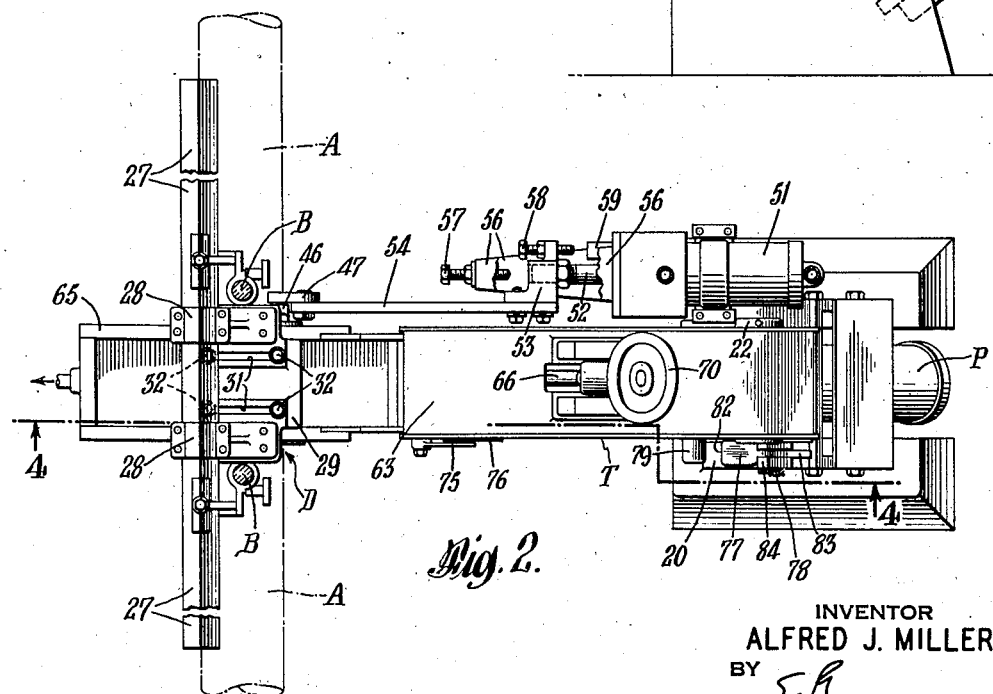
Fig. 2 is a plan view of the machine of Fig. 1.

The blowpipe machine is preferably installed adjacent any conventional or suitable type of conveyor for moving the bars into a position to be severed. Referring to the drawings, the blowpipe machine is readily adaptable for moving one or more blowpipes B across any one of a plurality of different sizes of bodies such as round or rectangular steel bars or billets. A steel bar may be supported by and moved into cutting position by any suitable means and may be supported by and propelled into position by a series of motor driven rollers R or may be propelled along such rollers into cutting position by external means.

The cutting machine includes a supporting base 20 adjacent the bar A. A link L is pivotally mounted on trunnions 21 in the base 20 and the boom T is pivotally mounted on trunnions 22 of link L. The boom T extends transversely toward the workpiece and the cutting torches B are supported by and propelled across the bar A by a link mechanism D. A cylinder P is pivotally mounted in bearings 23 on the base 20 and has a piston rod 24 pivotally connected at 25 to the link L. As will be more fully hereinafter described, when fluid under pressure is admitted to the head end of cylinder P the link L is moved through an arc about the axis of the trunnions 21 in a clockwise direction. As will be more fully hereinafter described, this movement of link L first moves the boom T in a substantially horizontally straight line toward the right and then moves the boom T through an arc about the axis of trunnions 21 to the position shown in broken lines in Fig. 1 to swing the outer end of the boom upward and away from the bar A. When the link L is moved in an anti-clockwise direction, the previously described movement of boom T is reversed.

Each blowpipe B is vertically adjustably mounted in a blowpipe holder which is horizontally adjustably mounted on a rectangular tube 27 which is substantially parallel to the bar A. The tube 27 is retained on one edge by two brackets 28 fastened to a plate 29. As shown more clearly in Figs. 2, 4, 7, and 8, a pair of elongated slots 31 are formed in plate 29 and in each slot 31, there is a pair of downwardly extending bolts 32, each of which engages a bearing block 33. The front pair of bearing blocks 33 are pivotally mounted on trunnions on the upper end of a front link 34. The rear pair of blocks 33 are similarly mounted on a similar rear link 35. A horizontal shaft 36 is pivotally mounted in bearings 37 in the forward end of boom T. On the shaft 36 there is fastened a member 38 having teeth 39 adapted to engage similar teeth 40 formed on one side of the front link 34. A bolt 41 extends through an elongated slot 42 in the link 34 and screws into the member 38. When the bolt 41 is tightened the link 34 is securely clamped in position and will move in unison with shaft 36. By loosening the bolt 41, the link 34 can be adjusted upwardly or downwardly to vary its effective length according to the size of the bar being severed. A counterweight 45 is fastened to the member 38 which is on shaft 43 for partially counterbalancing the weight of the blowpipes and plate 29.

The rear link 35 is adjustably secured in the same manner to a shaft 43 rotatably mounted in the bearings 44 in the boom T, see Fig. 8. Referring more particularly to Fig. 4, when the shaft 43 is rotated in a counter-clockwise direction, the blowpipes B are moved in a counter-clockwise direction through an arc and across the bar A to sever it. The bolt 32 may be loosened and the bearing blocks 33 moved towards each other so that when the shaft 43 is turned in a counter-clockwise direction, the blowpipes B are so moved as to move the lower nozzle ends of the blowpipes across and substantially parallel to a flat surface such as the top of a rectangular bar or billet. The links 34 and 35 may be readily adjusted for severing different sizes of round and rectangular bars or billets and are similar to the blowpipe supporting linkage shown and described in United States Letters Patent No. 2,283,345 issued May 19, 1942 to L. W. Young; and this type of support for the blowpipes B may hereinafter be referred to in the instant specification and claims as adjustable arm support means.

As shown more particularly in Figs. 3 and 8, a relatively short crank arm 46 is mounted on an outer end of shaft 43. An arm 47 is pivotally mounted on the boom T by means of a bolt 48. A relatively small roller 49 is rotatably mounted in the outer end of crank arm 46 and engages a slot 50 in arm 47. A hydraulic cylinder 51 is mounted on the boom T and has a piston rod 52 with a block 53 fastened to its outer end. An arm 54 is fastened to block 53 and is pivotally connected to the outer end of arm 47. When fluid under pressure is admitted to the head end of cylinder 51 the arm 47 is moved through an arc and toward the right as shown in Fig. 3. As the arm 47 moves toward the right, the crank arm 46 is moved to turn the shaft 43 to move the blowpipes across the bar as previously described. As the torches B are moved across the bar by the substantially constant force applied by cylinder 51, the roller 49 moves longitudinally in the slot 50 so that during the cutting cycle the leverage on the shaft 43 is automatically varied whereby the blowpipes are moved relatively fast at the starting and finishing portions of the cut and are moved relatively slow at the central portion of the cut. The bolt 48 is not vertically positioned beneath the shaft 43 but is displaced toward the rearward end of the boom so that during the first half of the cut the leverage on shaft 43 is slightly greater than during the last half of the cut to partially compensate for the weight of the blowpipes. The arcuate speed of the blowpipes is slightly greater at the finishing end of the cut than at the starting end of the cut. When a different size of bar is to be severed, the pressure and/or the rate of flow of fluid to the head end of cylinder 51 is also changed.

When cutting round bars such as the bar A, the shaft 43 and the links 34 and 35 are moved through an arc of substantially 140°, but when severing rectangular bars, the shaft 43 is rotated through only about 10° to 15°. When severing a rectangular bar the roller 49 is always in the upper portion of the slot 50 and the blowpipe speed is varied only a slight amount.

A relatively large bracket 56 is mounted on the cylinder 51 and includes an adjustable bolt 57 adapted to engage the block 53 to limit the forward movement of the piston rod 52 and to limit the forward movement of the blowpipes B across the bar A. A bolt 58 is adjustably mounted in the block 53 and is adapted to engage a stop 59 to limit the return stroke of the piston rod 52. By adjusting the bolts 57 and 58 the finishing and starting positions of the blowpipe and the arc through which the links 34 and 35 are moved can be adjusted. The bolts 57 and 58 are especially necessary when changing from round to rectangular bars and vice versa.

As more fully hereinafter described, the forward end of the boom T, when moved away from the bar A, is first moved substantially horizontally and is then swung through an arc so that the blowpipes B move through the path having a substantially straight portion adjacent the bar and an arcuate portion spaced from the bar. The link L is formed with a relatively wide flat upper portion 60. When air or fluid under pressure is admitted to the head end of the cylinder P the link L is moved through an arc about the axis of the trunnions 21. During the first part of the link movement, the boom T moves substantially horizontally toward the right and there is relative movement between the boom T and the link L about the axis of the trunnions 22. The link portion 60 engages the boom when the trunnions 22 are in the position indicated at 61, in Fig. 1, which prevents further relative movement between the link and boom. Further movement of the link L away from the bar and about the axis of the trunnions 21 moves the link L and the boom T as a single member about the axis of the trunnions 21 to the position shown in broken lines in Fig. 1, to swing the blowpipes upwardly and away from the bar.

When the pressure in the head end of the cylinder P is released, gravity tends to move the boom T downwardly through an arc about the axis of trunnions 21. When air or fluid is admitted under pressure to the rod end of cylinder P, the link L is swung in an anti-clockwise direction to move and urge the boom T downwardly into engagement with the bar A and toward the left until the finger 62 engages the side of the workpiece which accurately positions the blowpipes in the starting position.

The boom T is hinged and includes a rear hinge section 63 in which is rotatably mounted a shaft 64 on which is mounted a forward or front hinge section 65, see Figs. 1, 4, and 9. A rod 66 is pivotally mounted at 67 in section 63 and is formed with a threaded end for adjustably engaging the arm 68 rotatably mounted on a shaft 69 in the front section 65. On the outer end of rod 66 there is a handwheel 70 which can be manually turned to move or adjust the front section 65 about the axis of the shaft 64 and relative to the rear section 63. If the bar to be severed is smaller than the bar A, the handwheel is turned so as to swing the section 65 upwardly relatively to the section 63 and if the bar to be severed is larger than the bar A, the handwheel 70 is rotated in the opposite direction which in effect swings the forward section 65 downwardly. Thus, regardless of the size of the bar being severed the forward or outer section 65 of the boom T can always be adjusted so as to be in substantially a horizontal position, when in an operative position, and the rear section 63 inclined upwardly or downwardly depending upon the size of the bar being severed.

Referring more particularly to Figs. 1, 4, 9, and 12, finger 62 is mounted on the shaft 69 and is formed with a relatively short upwardly extending arm 71 which is connected to one end of a link 72. The link 72 is mounted at its opposite end on a fixed shaft 73 in section 63. The finger 62 and the arm 71 form in effect a bell crank so that when the handwheel 70 is rotated to adjust the boom T according to the size of the bar to be severed, the finger 62 is automatically adjusted so as to correctly position the outer end of the finger 62 to stop the movement of the boom toward the left when the blowpipes are in the starting position. On the outer end of shaft 64 there is fastened a pointer 75. A scale 76 is mounted on the side of the boom. When the handwheel 70 is rotated the section 65 is moved about its hinge connection to the rear section 63, the finger 62 is moved about the axis of shaft 64 with section 63 and is also swung about the axis of shaft 69, and the outer end of the pointer 75 is moved a corresponding amount along the scale 76. The scale 76 is preferably marked according to bar sizes so that when the handwheel 70 is rotated, the operator can watch the pointer 75 and determine when the machine has been correctly adjusted for the particular size of bar to be severed. When the machine has been correctly adjusted, the outer end of the bar contacting finger 62 is in such a position as to stop movement of the boom T toward the left by engaging the bar to be severed when the blowpipes B reach the correct starting position, and the member 65 is so adjusted that when the blowpipes B and the boom T are in the operative position the member 65 is substantially horizontal.

As shown in Figs. 4, 7 and 8, the member 65 may be formed with a hollow bottom and side walls through which a cooling fluid such as water may be circulated to prevent overheating.

As shown more particularly in Figs. 1, 4, 6, and 10, a latch 77 may be pivotally mounted at 78 for engaging a pin 79 extending outwardly from link L to limit the movement of link L about the axis of trunnions 21. A ball 80 is normally urged against the side of latch 77 by a spring 81. A recess is formed in the side of latch 77 which is normally engaged by the ball 80 to hold the latch in the position shown in full lines in Fig. 6. Normally, when air or fluid under pressure is admitted to the head of cylinder P the pin 79 will engage the end 82 of latch 77 whereby the movement of the boom upwardly and away from the workpiece is limited. At times it is desirable to swing the boom farther away from the workpiece to a more nearly vertical position. By lifting upwardly on the end 83 of latch 77, the latch can be moved to the position shown in broken lines in Fig. 4. With the latch in this position, the pin 79 will clear the latch, and the link L and the boom T can be swung about the axis of the trunnions 21 until the pin 79 engages the upwardly extending finger 84 on the base 20 at which time the boom T is in a substantially vertical position.

Suitable valves are provided for controlling the flow of a combustible and combustion supporting gases to the torches B. The torches B are adapted to discharge jets of a combustible gas mixture, such as a mixture of acetylene and oxygen, which upon ignition burn to form preheating flames. Each torch is also adapted to discharge a relatively voluminous stream of oxidizing gas, such as oxygen, which thermochemically reacts with the ferrous metal body to form a kerf therethrough.

Normally, when a body is not actually being severed, the boom T is maintained in the fully retracted position as shown in broken lines in Fig. 1. If the next body to be severed is of a different size than the previous body then the machine must be adjusted before severing the body. The handwheel 70 is manually turned to move or adjust the pointer 75 until it is co-extensive with the index marking on scale 76 that corresponds to the size of the bar to be severed. When the pointer 75 has been so adjusted, the forward hinge section 65 of the boom T is so tilted relative to the rear hinge section 63 that the forward section will be substantially horizontal when swung downwardly into engagement with the body to be severed. The finger 62 is also so positioned as to stop the movement of the boom T toward the left by engaging the side of the body when the torches B are correctly positioned at the starting edge. The linkage device D must be adjusted according to the size and shape of the bar to be severed. It also may be desirable to regulate the pressure and/or the rate of flow of fluid or air to the head end of cylinder 51 according to the size of the bar.

After such adjustments have been made, the pressure is relieved in the head end of the cylinder P and either simultaneously or after a short pause, air or fluid under pressure is admitted to the rod end of cylinder P which urges the front section 65 downwardly against the bar and moves and urges the boom T toward the left to move and urge the finger 62 against the side of the bar. After the torches B are positioned in an operative position adjacent the bar, the preheating gases are turned on for preheating starting zones to the ignition temperature. After a short preheating pause, cutting oxygen is turned on and simultaneously air or fluid under pressure is admitted to the head end of cylinder 51 to move the blowpipes or torches B across the bar. After the blowpipes B have been moved across the bar, all of the gases are turned off, air or fluid under pressure is admitted to the rod end of cylinder 51 to rapidly retract the starting blowpipes to their starting position and either simultaneously or after a short pause, air or fluid under pressure is admitted to the head end of cylinder P to retract and raise the boom T. When air or fluid is admitted to the head end of cylinder P, the blowpipes and the forward end of the boom are moved away from the bar in a path having a substantially horizontal straight portion adjacent the bar and an arcuate portion spaced away from the bar. This path of blowpipe movement is substantially the same as shown and described in the copending United States patent application Serial No. 418,225, filed by L. W. Young and T. S. James.

Having described the invention in detail, it is obvious that alterations could be made in the apparatus shown and that some features could be used without others, without departing from the spirit or scope of the invention. For instance, a different device could be used for supporting and propelling the blowpipes; one or more blowpipes could be used; and other types of torches, blowpipes, or gas discharging means could be propelled across such a body for welding, hardening, or heat treating such a bar. The bar to be severed could be supported in a vertical or inclined position and the blowpipe machine could be located in the same relative position.

What is claimed is:

1. A blowpipe machine for propelling a blowpipe across a metal body when supported in a position for treatment and comprising in combination, a support adjacent such a body; a link pivotally connected to said support and swingable toward and away from said body; a boom pivotally connected adjacent its rearward end portion to said link and extending toward said body, said link and said boom being so constructed and arranged that there is limited relative movement between said boom and said link about the pivot connection therebetween and said boom having a forward end portion adapted to support a blowpipe adjacent said body; means for swinging said link about its pivotal connection to said support whereby said forward end portion of said boom is moved in a path toward and away from the body, said path having a substantially straight portion and an arcuate portion, said straight path portion being adjacent said body and said arcuate path portion being remote from said body; and means on said boom for propelling a blowpipe across said body when said forward end portion is in an operative position adjacent said body.

2. A machine for propelling a blowpipe across a metal body, such as a steel bar, when supported in position for treatment and comprising, in combination, a support adjacent such body; a link pivotally connected adjacent one end to said support for arcuate movement about the axis of said pivotal connection toward and away from said body; a boom pivotally connected adjacent its rearward portion to the other end portion of said link, said boom extending toward said body and having a forward end portion normally adjacent said body, said boom and said link being movable relative to each other about said pivotal connection therebetween; a blowpipe supported by said forward end portion of said boom; means for propelling said blowpipe across said body when said forward end portion is supported in an operative position adjacent said body; means for limiting the relative movement between said boom and said link; and power-actuated means for swinging said link in an arc away from said body to retract said blowpipe substantially in a straight line away from an operative position adjacent said body and then to move said blowpipe in an arc about the axis of said pivotal connection between said link and said support and farther away from said body.

3. A blowpipe machine as claimed in claim 2 in which said forward end of said boom is adapted to slidingly engage said body for movement in approximately a straight line across said body for approximately all cutting adjustments of the machine.

4. A machine for propelling one or more blowpipes across a metal body of any of a plurality of sizes such as a round or rectangular steel bar when supported in a horizontal position and comprising, in combination, a support adjacent the side of such a body; an upwardly extending link pivotally connected adjacent its lower end to said support and swingable toward and away from said body; a boom pivotally connected adjacent its rearward end to the upper end of said link, said boom extending toward said body and having a forward end adapted to engage said body; a blowpipe movably supported at said forward end; means for propelling said blowpipe across said body when in an operative position adjacent said body; power-actuated means connected to said link for swinging and urging said link toward and away from said body; and means effective to limit relative movement of said boom and said link whereby said forward end of said boom is moved substantially horizontally across said body and is moved through an arc away from said body to move said blowpipe through a path, said path having a substantially horizontal portion adjacent said body and a substantially arcuate portion remote from said body.

5. A blowpipe machine as claimed in claim 2 which includes an adjustable stop adapted to engage the side of said body when said link is moved and urged toward said body for stopping the horizontal movement of said boom when said blowpipe is in a starting position adjacent the starting edge of said body.

6. A blowpipe machine as claimed in claim 2 which includes a hinged joint connecting the forward and rearward portions of said boom; and means operable for adjusting the relative positions of said forward and said rearward portions a predetermined amount to maintain said forward portion in a substantially horizontal position when in engagement with said body.

7. A blowpipe machine as claimed in claim 2 which includes a shaft rotatably mounted in the forward end of the rearward portion of said boom and on which the rearward end of the forward portion of said boom is mounted; a manually rotatable rod mounted in said rearward portion and operatively connected to said forward portion for swinging said forward portion vertically upwardly or downwardly about the axis of said shaft a predetermined amount to maintain said forward portion in a substantially horizontal position when in engagement with said body; a bellcrank finger pivotally mounted in said forward portion and having one end adapted to engage the side of said body for stopping the horizontal movement of said boom when said blowpipe is in the starting position adjacent the starting edge of said body and having the other end connected to said rearward portion whereby said body engaging end of said finger is automatically correctly positioned when said forward portion is adjusted relative to said rearward portion; a pointer connected to said shaft; and a scale on said rearward portion and adapted to be coextensive with the path of movement of said pointer for visually indicating the size of body for which the machine is adjusted.

8. A blowpipe machine as claimed in claim 2 in which said means effective to prevent relative movement between said boom and said link includes a forwardly extending portion of said link adapted to move into engagement with said boom when said link has been swung a predetermined distance from said body whereby further movement of said link away from said body swings said boom upwardly to move said blowpipe through said arc.

9. Blowpipe apparatus comprising a blowpipe mechanism for supporting and propelling said blowpipe at a varying speed and in a substantially perpendicular plane across a surface of a horizontal metal body; said mechanism comprising a horizontal shaft rotatable about its longitudinal axis which is perpendicular to said plane; an upwardly extending link operatively connected to said shaft and carrying said blowpipe for movement across said surface when said shaft is rotated; a crankarm operatively connected to said shaft, said crankarm and said link being so arranged that they are substantially parallel and are substantially perpendicular when said blowpipe is substantially midway of said surface; a cam pivotally mounted for swinging movement in an arc and in a perpendicular transverse plane; an elongated slot formed in said cam and adapted to receive the outer end of said crankarm for turning said shaft when said arm is moved through said arc, said slot being extended substantially in the direction of a radius of said arc; a cylinder; a piston in said cylinder and operatively connected to said arm; means for admitting fluid or gas under pressure to said cylinder for applying a substantially constant force to said arm for moving it through said arc, said constant force exerting a turning leverage on said shaft varying as said outer end moves longitudinally in said slot to move said blowpipe across said surface at a predetermined varying speed, the pivot axis of said arm being transversely displaced toward the starting edge of said plane whereby the varying leverage on said shaft is slightly greater during the starting portion of the blowpipe movement than during the finishing portion of the blowpipe movement.

10. A machine for supporting and propelling a blowpipe across a metal body, which comprises the combination of a support adapted to be positioned adjacent one side of said body; an elongated boom extending transversely of said body; connective means connecting said support and one end portion of said boom so that a free end portion thereof can be moved forwardly and rearwardly and upwardly and downwardly in an arcuate path; a blowpipe; blowpipe mechanism for supporting and propelling said blowpipe carried by said boom adjacent said free end portion; means for positioning said blowpipe in predetermined operative position relative said metal body and adapted to aid in maintaining said blowpipe mechanism in a relatively fixed position during the propulsion of said blowpipe; and power-actuated means associated with said boom and operable to move the same forwardly and downwardly or rearwardly and upwardly; all of said parts being so arranged that the free end portion of said boom and said blowpipe mechanism can be moved forwardly and downwardly into operative position adjacent said body or rearwardly and upwardly into inoperative position substantially spaced away from said body.

11. A machine as defined in claim 10 wherein said connective means comprise a link pivotally connected at one end to said base and pivotally connected at its other end to said boom.

12. A machine as defined in claim 10 which additionally includes power-actuated mechanism for propelling said blowpipe in a predetermined path and at predetermined varying speeds.

13. A machine as defined in claim 10 wherein said boom is articulated and moved approximately horizontally across said body for approximately all cutting adjustments of the machine, and is then moved through an arc away from said body, so that the path of the boom has a substantially horizontal portion adjacent said body and a substantially arcuate portion remote from said body.

14. A machine as defined in claim 10 wherein said connective means comprises a link pivotally connected at one end to said base and pivotally connected at its other end to said boom so that said link and said boom are movable relative to each other about their pivotal connection and wherein means are provided for limiting the relative movement between said boom and said link.

15. A machine as defined in claim 10 wherein said connective means comprises a link pivotally connected at one end to said base and pivotally connected at its other end to said boom so that said link and said boom are movable relative each other and which further includes means to limit said relative movement, power-actuated means for propelling said blowpipe at predetermined varying speeds along a horizontal path adjacent said body, and along an arcuate path remote from said body.

16. A machine for severing a relatively heavy metal body which includes at least one blowpipe; a power-acuated propelling means associated with said blowpipe for propelling the latter at predetermined varying speeds and in a predetermined path relative the body; power-actuated mechanism for advancing and retracting said propelling means and said blowpipe as a unit toward and away from said body, and including a pivotally mounted articulated boom member having two hinged sections and means adapted to provide a plurality of adjustable angular relationships between said sections; and means for positioning said blowpipe in predetermined position relative said body when the blowpipe is advanced to an operative position.

17. A machine as defined in claim 16 wherein said means for positioning said blowpipe includes a contact mechanism associated with said boom member adapted to contact the body and wherein said means adapted to provide adjustable angular relationships between the hinged sections of said boom includes a rotatably mounted rod member pivotally mounted to one of said sections and adapted to engage a cooperating socket member associated with the other section of said boom member.

18. A machine as defined in claim 16 wherein the said power-acuated mechanism for advancing and retracting said propelling means of said blowpipe as a unit toward and away from said body is adapted to move the same in a relatively straight path adjacent the work and in an arcuate path away from the work.

19. In a machine for propelling a blowpipe at a variable speed across a body, the combination of a rotatable shaft; a link connected to said shaft and adapted to support and move the blowpipe across said body as said shaft is turned; and power-actuated mechanism for turning said shaft at an automatically varied rotational speed to move said blowpipe at varying speed across the body, which includes a crankarm connected at one end to said shaft, a cam pivotally supported for swinging movement, an elongated cam slot formed in said cam and adapted to be engaged by the other end of said crankarm, said slot being so constructed and arranged that when said shaft is turned, said other crankarm end moves in said slot to positions at different distances from the pivot axis of said cam, and means for applying a substantially constant force tending to turn said shaft and move said blowpipe, said slot and said crankarm being so constructed and arranged that the rotational speed of said shaft is proportionate to the distance of said other crankarm end from the pivot axis of said cam.

20. In a machine for propelling a blowpipe at a variable speed across a body, the combination of a rotatable shaft; a link connected to said shaft and adapted to support and move the blowpipe across said body as said shaft is turned; and power-actuated mechanism for turning said shaft at an automatically varied rotational speed to move said blowpipe at varying speed across the body, which includes a crankarm connected at its inner end to said shaft, a lever pivotally supported for swinging movement, an elongated cam slot in said lever, an outer end of said crankarm adapted to engage said slot, power-actuated means for applying substantially constant force tending to swing said lever in an arc, said lever and said crankarm being so constructed and arranged that said force produces a varying torque on said shaft, as said shaft turns, whereby said shaft is turned at a predetermined varying speed.

21. In a machine for propelling a blowpipe at a variable speed across a body, the combination of a rotatable shaft, a link connected to said shaft and adapted to support and move the blowpipe across said body as said shaft is turned, and power-actuated mechanism for turning said shaft at an automatically varied rotational speed to move said blowpipe at varying speed across the body, which includes a crankarm connected at its inner end to said shaft, a cam lever pivotally supported for swinging movement, a cam slot in said lever, an outer end of said crankarm adapted to engage said cam slot whereby said crankarm is moved when said cam lever is moved, a cylinder having a piston rod connected to said lever for moving said lever in an arc, said piston applying a substantially constant force against said lever, and said cam slot being so constructed and arranged that during the movement of said lever the torque on said shaft varies whereby the rotational speed of said shaft varies.

22. A machine for severing a relatively heavy metal body which includes at least one thermal cutting device, a power-actuated propelling means associated with said cutting device for propelling the latter in a predetermined path relative to said body; power-actuated mechanism for advancing and retracting said propelling means and said cutting device as a unit toward and away from said body; and adjustable means for positioning said cutting device in predetermined position relative to said body when said cutting device is advanced to an operative position.

23. A machine for severing a relatively heavy metal body which includes at least one thermal cutting device, a power-actuated means associated with said cutting device for propelling the latter in a predetermined path relative to said body, power-actuated mechanism for advancing and retracting said propelling means and said cutting device as a unit toward and away from said body, means associated with the power-actuated advancing and retracting mechanism for positioning said cutting device in a predetermined position relative to said body when said cutting device is advanced to an operative position, said power-actuated mechanism including a swingable link and boom pivotally connected to the link, said cutting device being supported by said boom, and said boom and said link being arranged for relative movement so that the boom is adapted to move first in an arcuate path and then in a straight path when advanced toward the metal body.

24. A blowpipe machine for propelling a blowpipe across a metal body when supported in position for treatment and comprising, in combination, a support adjacent said body; a boom movably carried by said support and extending toward said body, said boom having an end portion adapted to support a blowpipe in an operative position adjacent said body, said boom being movable substantially in the direction of its length and swingable about a pivot axis; and a power-actuated mechanism operatively connected to said boom for moving said boom to move said forward end in a path toward and away from said operative position adjacent said body, said path having a substantially straight portion adajcent said body and an arcuate portion spaced from said body.

25. A blowpipe machine as claimed in claim 24 in which said boom is articulated and which includes means on said forward boom end adapted to engage the side of the bar when said blowpipe is moved horizontally toward an operative position for aligning said forward end with said body.

26. A machine for supporting and propelling a blowpipe across a metal body which comprises the combination of a support adapted to be mounted adjacent one side of said body; an elongated boom extending transversely of said body and in a plane substantially perpendicular to the longitudinal axis of said body; connective means connecting said support and one end portion of said boom so that a free end portion thereof can be moved longitudinally forwardly and rearwardly and swung upwardly and downwardly in an arcuate path; a blowpipe; power-actuated blowpipe mechanism for supporting and propelling said blowpipe, carried by said boom adjacent said free end portion; means associated with said free end portion for engaging said body and for maintaining said free end portion and blowpipe mechanism carried thereby in a relatively fixed position during the propulsion of said blowpipe; power-actuated means connected to said connective means and operable to move said boom forwardly and downwardly or rearwardly and upwardly; all of said parts being so constructed and arranged that the free end portion of said boom is moved in a path toward and away from an operative position adjacent said body; said path having a substantially straight portion adjacent said body and an arcuate portion spaced from said body, said free end of said boom being adapted to slidingly engage said body for movement in substantially a straight line across said body, and said means associated with said free end portion of said boom for engaging said body including a contact arm depending downwardly from said boom and adapted to contact said body as the boom is moved thereacross.

27. A machine for supporting and propelling a blowpipe across a metal body which comprises the combination of a support adapted to be mounted adjacent one side of said body; an elongated boom extending transversely of said body and in a plane substantially perpendicular to the longitudinal axis of said body; connective means connecting said support and one end portion of said boom so that a free end portion thereof can be moved longitudinally forwardly and rearwardly and swung upwardly and downwardly in an arcuate path; a blowpipe; power-actuated blowpipe mechanism for supporting and propelling said blowpipe, carried by said boom adjacent said free end portion; means associated with said free end portion for engaging said body and for maintaining said free end portion and blowpipe mechanism carried thereby in a relatively fixed position during the propulsion of said blowpipe; power-actuated means connected to said connective means and operable to move said boom forwardly and downwardly or rearwardly and upwardly; all of said parts being so constructed and arranged that the free end portion of said boom is moved in a path toward and away from an operative position adjacent said body, said path having a substantially straight portion adjacent said body and an arcuate portion spaced from said body; said power-actuated blowpipe mechanism being adapted to propel said blowpipe at a variable speed across a body of variable thickness and including a rotatable shaft, a link connected to said shaft adapted to support and move the blowpipe across the body as the shaft is turned, and power-actuated mechanism for turning said shaft at an automatically varied rotational speed to move said blowpipe at a predetermined varying speed across said body.

ALFRED J. MILLER.